(12) United States Patent
Guo et al.

(10) Patent No.: US 7,898,762 B1
(45) Date of Patent: Mar. 1, 2011

(54) DISK DRIVE EXCLUDING SERVO SUB-BURSTS WHEN COMPUTING POSITION ERROR SIGNAL

(75) Inventors: Guoxiao Guo, Foothill Ranch, CA (US); Abhishek Dhanda, Mission Viejo, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/582,863

(22) Filed: Oct. 21, 2009

(51) Int. Cl.
*G11B 5/596* (2006.01)

(52) U.S. Cl. .................................. 360/77.08; 360/31

(58) Field of Classification Search ............... None
See application file for complete search history.

(56) References Cited

U.S. PATENT DOCUMENTS

| | | | |
|---|---|---|---|
| 4,438,467 A | 3/1984 | Schaller et al. | |
| 5,483,393 A | 1/1996 | Mento et al. | |
| 5,710,677 A | 1/1998 | Teng et al. | |
| 5,798,883 A | 8/1998 | Kim | |
| 5,870,243 A | 2/1999 | Ukani et al. | |
| 5,930,068 A | 7/1999 | Gregg et al. | |
| 6,005,739 A | 12/1999 | Yun | |
| 6,144,513 A | 11/2000 | Reed et al. | |
| 6,151,180 A | 11/2000 | Bang | |
| 6,172,836 B1 | 1/2001 | Bang | |
| 6,445,522 B1 * | 9/2002 | Tsunoda et al. | 360/77.02 |
| 6,476,997 B2 * | 11/2002 | Fukushima et al. | 360/77.08 |
| 6,611,397 B1 | 8/2003 | Nguyen | |
| 6,687,080 B2 * | 2/2004 | Smith et al. | 360/77.08 |
| 6,735,040 B2 | 5/2004 | Galloway et al. | |
| 6,791,778 B2 | 9/2004 | Chu et al. | |
| 6,906,883 B2 | 6/2005 | Chu et al. | |
| 7,009,391 B2 | 3/2006 | Lee et al. | |
| 7,161,759 B1 | 1/2007 | Zhang et al. | |
| 7,203,024 B2 | 4/2007 | Lee et al. | |
| 7,209,314 B2 | 4/2007 | Bandic et al. | |
| 7,212,364 B1 * | 5/2007 | Lee | 360/77.02 |
| 7,248,426 B1 | 7/2007 | Weerasooriya et al. | |
| 7,391,583 B1 * | 6/2008 | Sheh et al. | 360/77.08 |
| 7,746,592 B1 * | 6/2010 | Liang et al. | 360/77.07 |
| 2007/0273992 A1 | 11/2007 | Kuroda | |
| 2008/0239536 A1 | 10/2008 | Asakura | |

* cited by examiner

*Primary Examiner*—Hoa T Nguyen
*Assistant Examiner*—James L Habermehl

(57) ABSTRACT

A disk drive is disclosed comprising a head actuated over a disk, the disk including a plurality of servo sectors wherein each servo sector comprises at least one servo burst. A read signal emanating from the head is sampled while reading a servo burst in a servo sector to generate a plurality of sample values. A quality metric is generated in response to a plurality of sample values of a servo sub-burst representing part of the servo burst. When the quality metric does not exceed a threshold, the servo sub-burst sample values are excluded when generating a position error signal (PES) representing a position of the head over the disk. When the quality metric exceeds the threshold, the servo sub-burst sample values are included when generating the PES. The head is then positioned over the disk in response to the PES.

24 Claims, 12 Drawing Sheets

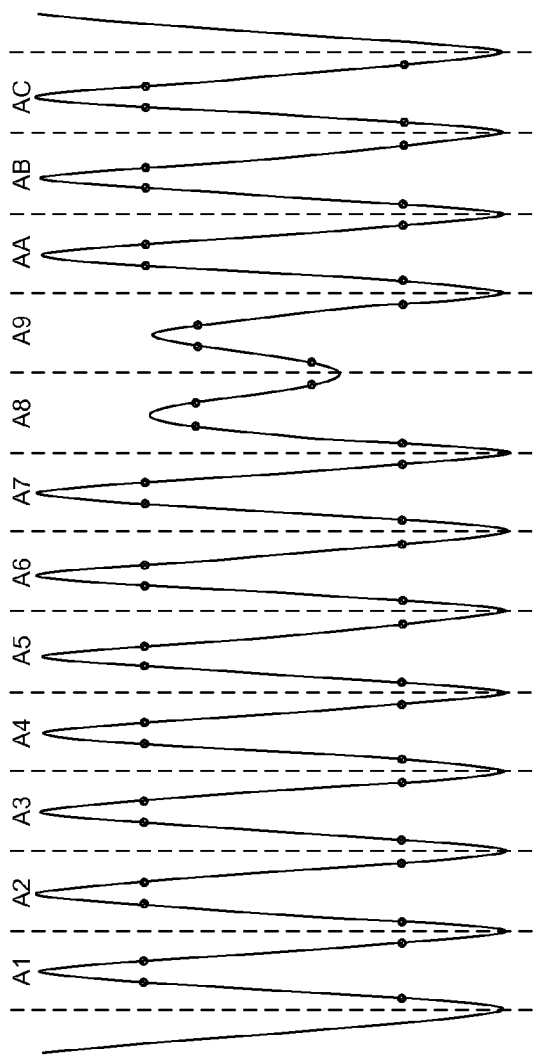
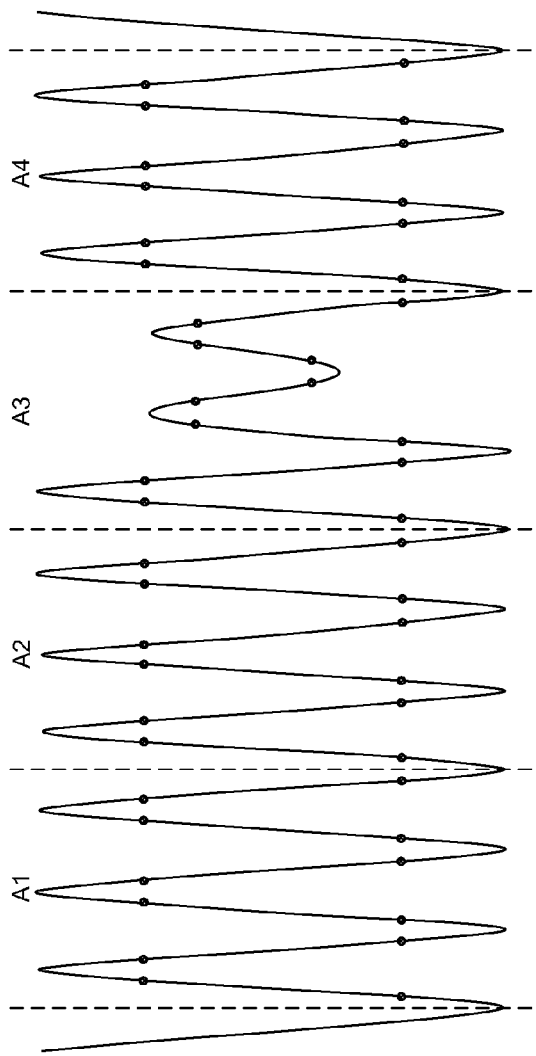

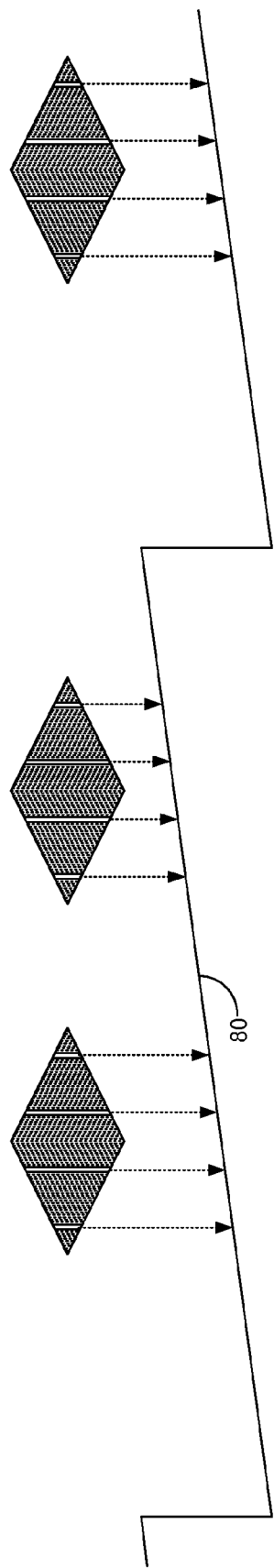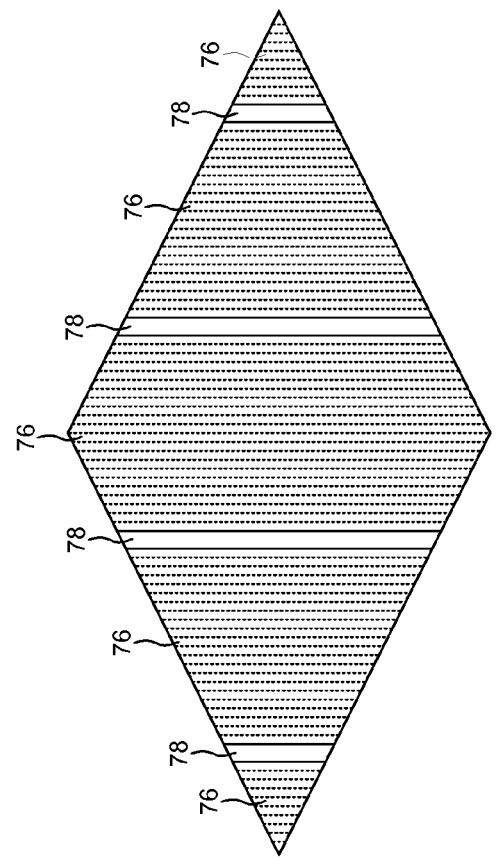

US 7,898,762 B1

DISK DRIVE EXCLUDING SERVO SUB-BURSTS WHEN COMPUTING POSITION ERROR SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

FIG. 1 shows a prior art disk format 2 comprising a number of data tracks 4 defined by concentric servo sectors $6_0$-$6_N$ recorded around the circumference of each data track. Each servo sector 6, comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

BRIEF DESCRIPTION OF THE DRAWINGS

FIG. 3A shows a periodic signal representing the read signal while reading a servo burst, including twelve sub-bursts wherein two of the sub-bursts are defective according to an embodiment of the present invention.

FIG. 3B shows a periodic signal representing the read signal while reading a servo burst, including four sub-bursts wherein one of the sub-bursts is defective according to an embodiment of the present invention.

FIG. 7A shows an embodiment of the present invention wherein a servo write clock is synchronized by clocking a modulo-N counter relative to when the sync marks in the spiral tracks are detected.

FIG. 7B shows an eye pattern generated by reading the spiral track, including the sync marks in the spiral track.

DETAILED DESCRIPTION OF EMBODIMENTS OF THE INVENTION

Figure 2A:
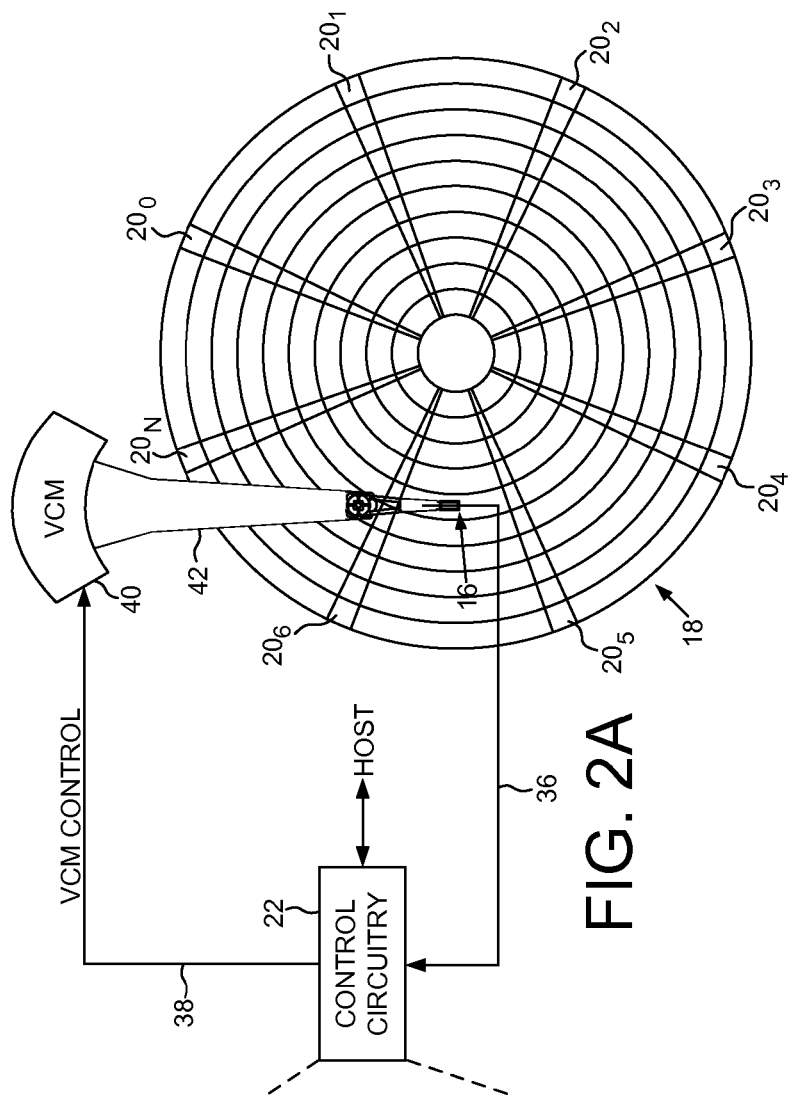
FIG. 2A shows a disk drive according to an embodiment of the present invention comprising a head actuated over a disk and control circuitry.

FIG. 2A shows a disk drive according to an embodiment of the present invention comprising a head 16 actuated over a disk 18, the disk 18 including a plurality of servo sectors $20_0$-$20_N$ wherein each servo sector 20, comprises at least one servo burst. The disk drive further comprises control circuitry 22 for executing the flow diagram of FIG. 2B. A read signal emanating from the head is sampled while reading a servo burst in a servo sector to generate a plurality of sample values (step 24). A quality metric is generated in response to a plurality of sample values of a servo sub-burst representing part of the servo burst (step 26). When the quality metric does not exceed a threshold (step 28), the servo sub-burst sample values are excluded when generating a position error signal (PES) representing a position of the head over the disk (step 30). When the quality metric exceeds the threshold (step 28), the servo sub-burst sample values are included when generating the PES. After reading all of the servo sub-bursts (step 32), the head is positioned over the disk in response to the PES (step 34).

In the embodiment of FIG. 2A, the control circuitry 22 processes the read signal 36 to demodulate the servo sectors $20_0$-$20_N$ into the PES. The PES is filtered with a suitable compensation filter to generate a control signal 38 applied to a voice coil motor (VCM) 40 which rotates an actuator arm 42 about a pivot in order to position the head 16 radially over the disk 18 in a direction that reduces the PES. The servo sectors $20_0$-$20_N$ may comprise any suitable position information, such as a track address for coarse positioning and servo bursts for fine positioning.

FIG. 3A shows a periodic signal representing the read signal while reading a servo burst, including twelve sub-bursts (A1-AC) wherein two of the sub-bursts (A8-A9) are defective resulting in a poor quality metric. Any suitable quality metric may be generated, wherein in one embodiment the read signal samples of a sub-burst are integrated to generate an amplitude that is compared to a threshold (or thresholds). If the amplitude of a sub-burst exceeds a threshold (e.g., if the amplitude is too small or too large), the sub-burst is considered defective and not included when generating the PES. The read signal samples representing a servo burst may be grouped to form any suitable number of sub-bursts. For example, FIG. 3B shows an embodiment wherein a servo burst is divided into four sub-bursts, wherein sub-burst A3 is detected as defective. Any suitable sampling scheme may be employed having any suitable phase offset (e.g., sampling near the zero crossings and peaks of the read signal shown in FIGS. 3A and 3B).

Figure 4B:
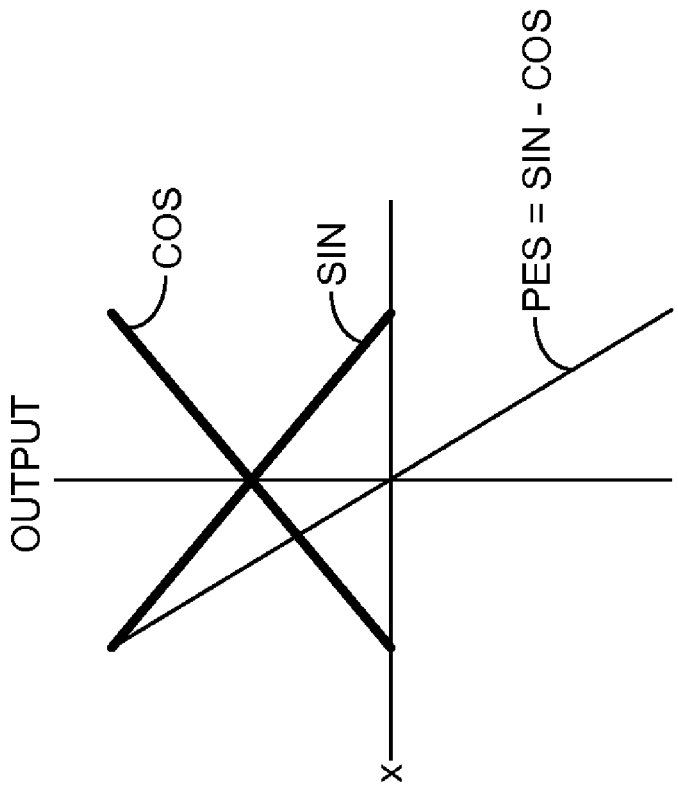
FIGS. 4A-4B illustrate an embodiment of the present invention wherein the servo burst comprises a phase based servo burst.
Figure 4A:
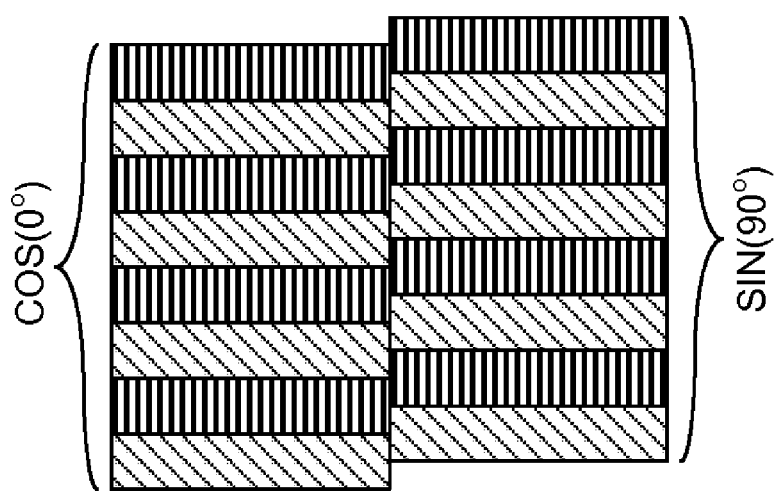

FIG. 4A shows an embodiment of the present invention wherein the servo bursts of adjacent servo tracks (top and bottom) comprise an orthogonal phase servo pattern. With an orthogonal phase servo pattern, servo burst of adjacent tracks are offset by 90 degrees. In the embodiment of FIG. 4A, each servo burst comprises a plurality of burst cycles, wherein a phase of each burst cycle is the same. FIG. 4B illustrates the output of the read signal as the head moves radially over the disk. When the read element 16A of the head is centered over the top servo track of FIG. 4A, the absolute magnitude of the COS(0°) signal is maximum, and the absolute magnitude of the SIN(90°) signal is minimum. As the read element 16A moves radially over the disk toward the bottom servo track of FIG. 4A, the absolute magnitudes of the signals flip as shown in FIG. 4B. The position error signal (PES) is therefore generated as the difference between the SIN and COS components as shown in FIG. 4B.

As the read element 16A moves radially over the disk, the amplitude of the resulting periodic read signal when reading the phased based servo bursts will remain substantially constant. If a deviation in the amplitude of the read signal is detected (drop-out or drop-in), the corresponding sub-burst is excluded from the COS and SIN computations. The resulting PES is thereby computed using only the sub-bursts having an amplitude that fall within an acceptable range. Any suitable amplitude range (and corresponding thresholds) may be used in the embodiments of the present invention for determining whether each sub-burst is acceptable or defective. In one embodiment, the thresholds that determine the range may be adjusted across the radius of the disk and/or around the circumference of the disk to compensate for changes in the servo bursts patterns due to manufacturing tolerances. For example, if the servo bursts are written to the disk using a magnetic printing technique, there may be acceptable variations in the servo bursts (radially and/or circumferentially) that may change the nominal amplitude for determining the thresholds used to detect defective sub-bursts. In one embodiment, the nominal amplitude may be generated and adapted by computing a running average of the servo burst amplitude over a number of servo sectors. In another embodiment, the nominal amplitude may be generated as the average (or majority vote) of the sub-burst amplitudes within a single servo sector.

Any suitable servo burst pattern may be employed in the embodiments of the present invention, including any suitable phase based servo burst pattern or any suitable amplitude based servo burst pattern. Suitable amplitude based servo burst patterns may include the prior art quad-burst pattern shown in FIG. 1, or a null-type servo burst pattern. With an amplitude based servo burst pattern, the amplitude of each servo burst varies as the radial location of the head changes. Therefore, the thresholds for detecting defective sub-bursts within any one servo burst must be adjusted as the head moves radially over the disk. In addition, with an amplitude based servo burst when a defective sub-burst is excluded, it must be accounted for when computing the amplitude of the full burst. For example, in one embodiment the amplitude of a servo burst is generated by integrating the sample values of the read signal. If a defective sub-burst is excluded, the final integration must be scaled to account for the missing sub-burst. For example, the integration may be multiplied by a scalar, or the integrated value of a good sub-burst substituted for the integrated value of a defective sub-burst.

Figure 5A:
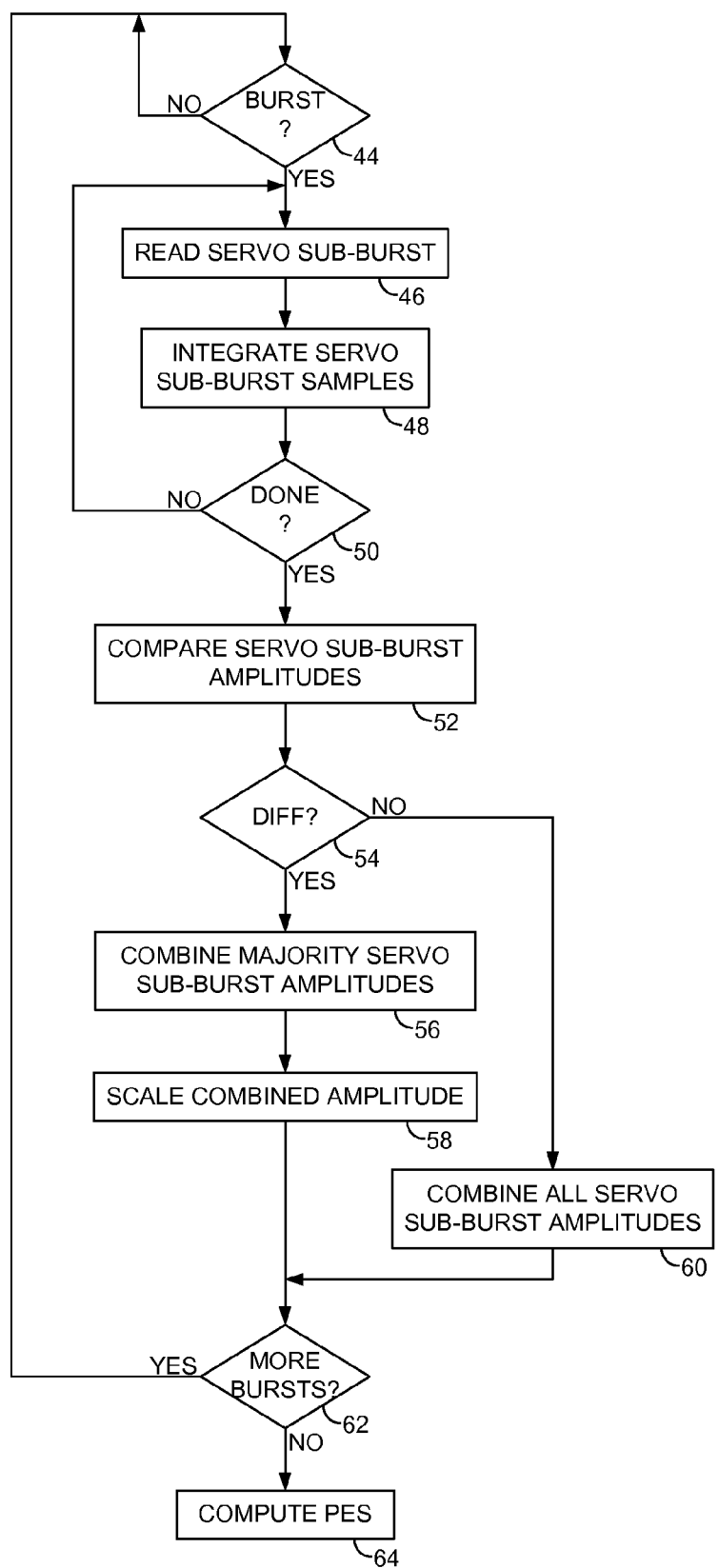
FIG. 5A is a flow diagram according to an embodiment of the present invention wherein an amplitude of the servo bursts are compared and the majority amplitudes selected to generate the PES.

FIG. 5A is a flow diagram according to an embodiment of the present invention for demodulating an amplitude based servo burst pattern. When the head is over a servo sector and begins reading a servo burst (step 44) the head reads a sub-burst (step 46) and the sample values of the sub-burst integrated to generate a sub-burst amplitude value (step 48). The process is repeated for each sub-burst (step 50). After generating an amplitude value for each sub-burst, the amplitudes of the sub-bursts are compared (step 52). If the amplitudes of the sub-bursts are different (step 54), a majority vote is used to select the sub-burst amplitudes to combine (step 56), and the resulting amplitude scaled to account for the excluded sub-bursts (step 58). If the amplitudes of the sub-bursts are all substantially equal, then all of the amplitudes of the sub-bursts are combined (step 60). The process is then repeated for the next servo burst until all of the servo bursts have been read and corresponding amplitude value generated. The servo bursts amplitudes are then processed to computer the PES for servoing the head (step 64).

Figure 5B:
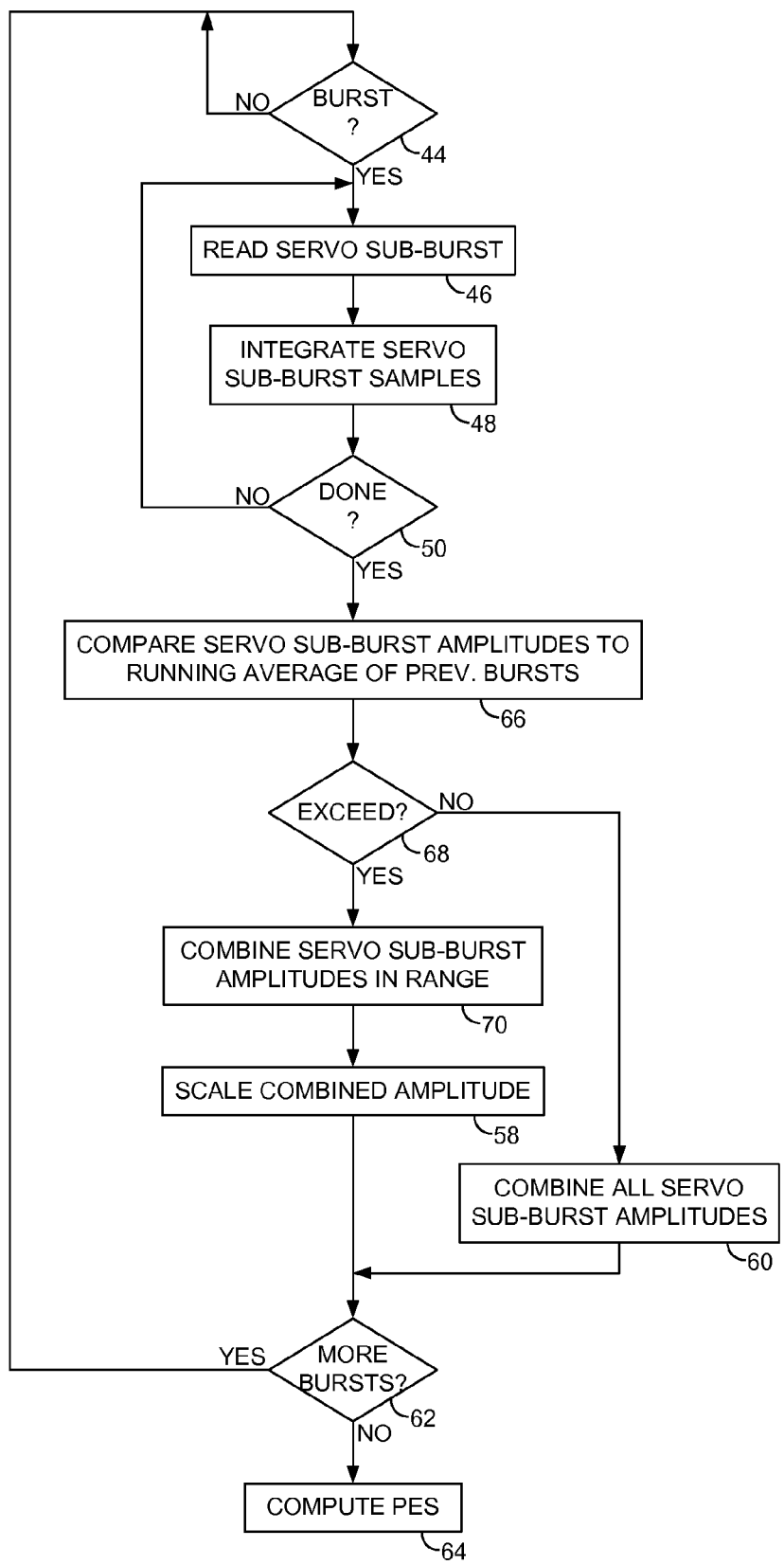
FIG. 5B is a flow diagram according to an embodiment of the present invention wherein a quality metric threshold is determined from a running average of the quality metrics generated while reading previous servo sectors.

FIG. 5B is a flow diagram according to an embodiment of the present invention wherein after generating an amplitude value for each sub-burst of a servo burst, the amplitude values are compared to a threshold generated from a running average of previously read servo bursts from previously read servo sectors (step 66). For example, if reading an "A" servo burst from a quad-burst servo pattern of FIG. 1, the threshold is generated as the running average of the amplitude of the "A" servo burst from previously read servo sectors. If any of the servo sectors exceed a range based on the running average (step 68), the amplitudes of the sub-burst that fall within the range are combined (step 70). If the amplitudes of the sub-bursts all fall within the range based on the running average (step 68), then the amplitudes of all of the sub-bursts are combined (step 60).

Figure 5C:
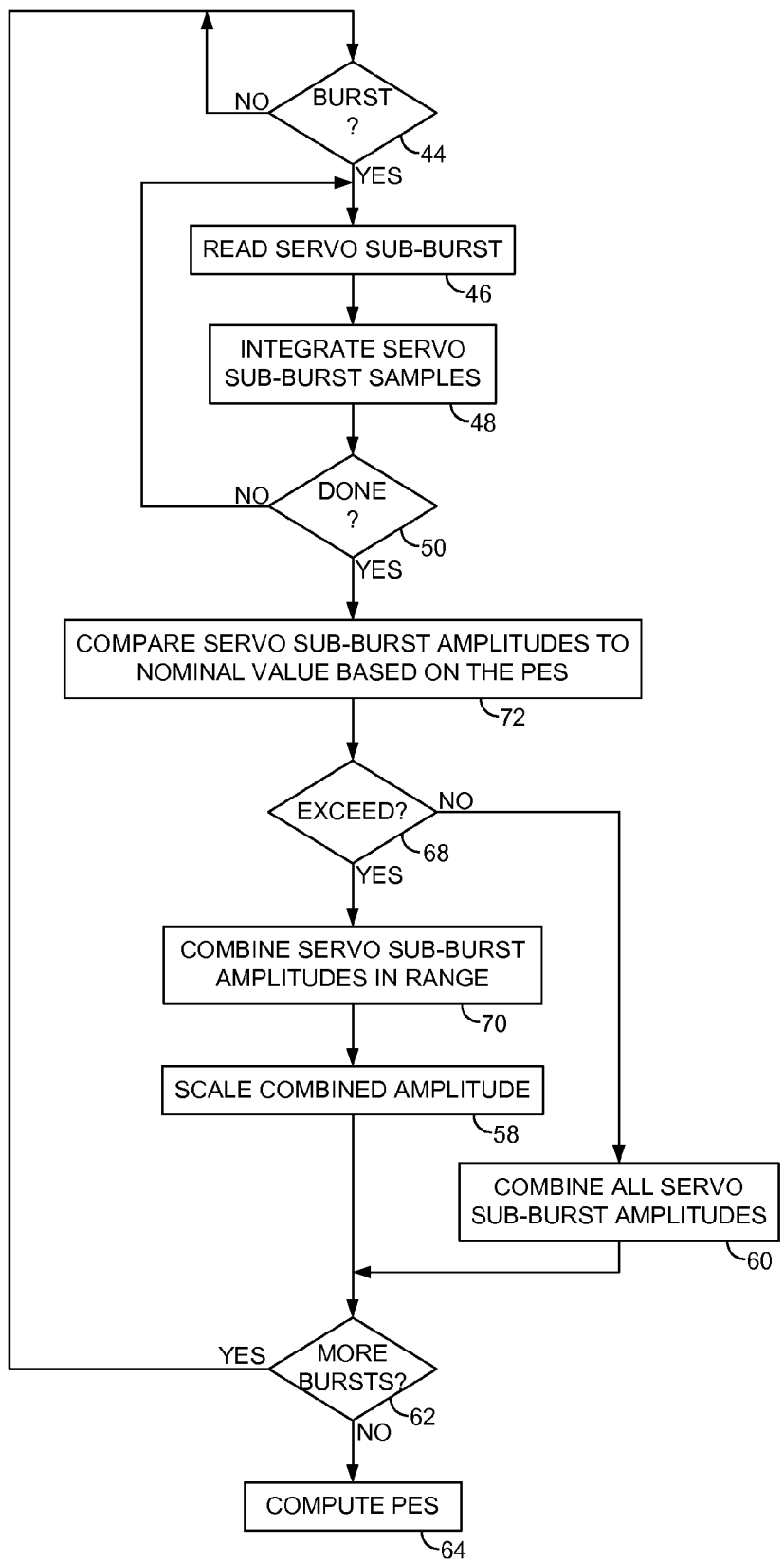
FIG. 5C is a flow diagram according to an embodiment of the present invention wherein the quality metric for a servo sub-burst is compared to a nominal value based on the PES generated while reading previous servo sectors.

FIG. 5C is a flow diagram according to an embodiment of the present invention wherein after generating an amplitude value for each sub-burst of a servo burst, the amplitude values are compared to a threshold generated from a nominal value based on the PES generated while reading previous servo sectors (step 72). For example, the nominal value may be calibrated at various radial locations and for different PES corresponding to different track offsets. The calibrated nominal values are then used to detect defective sub-bursts during normal operation.

Figure 6:
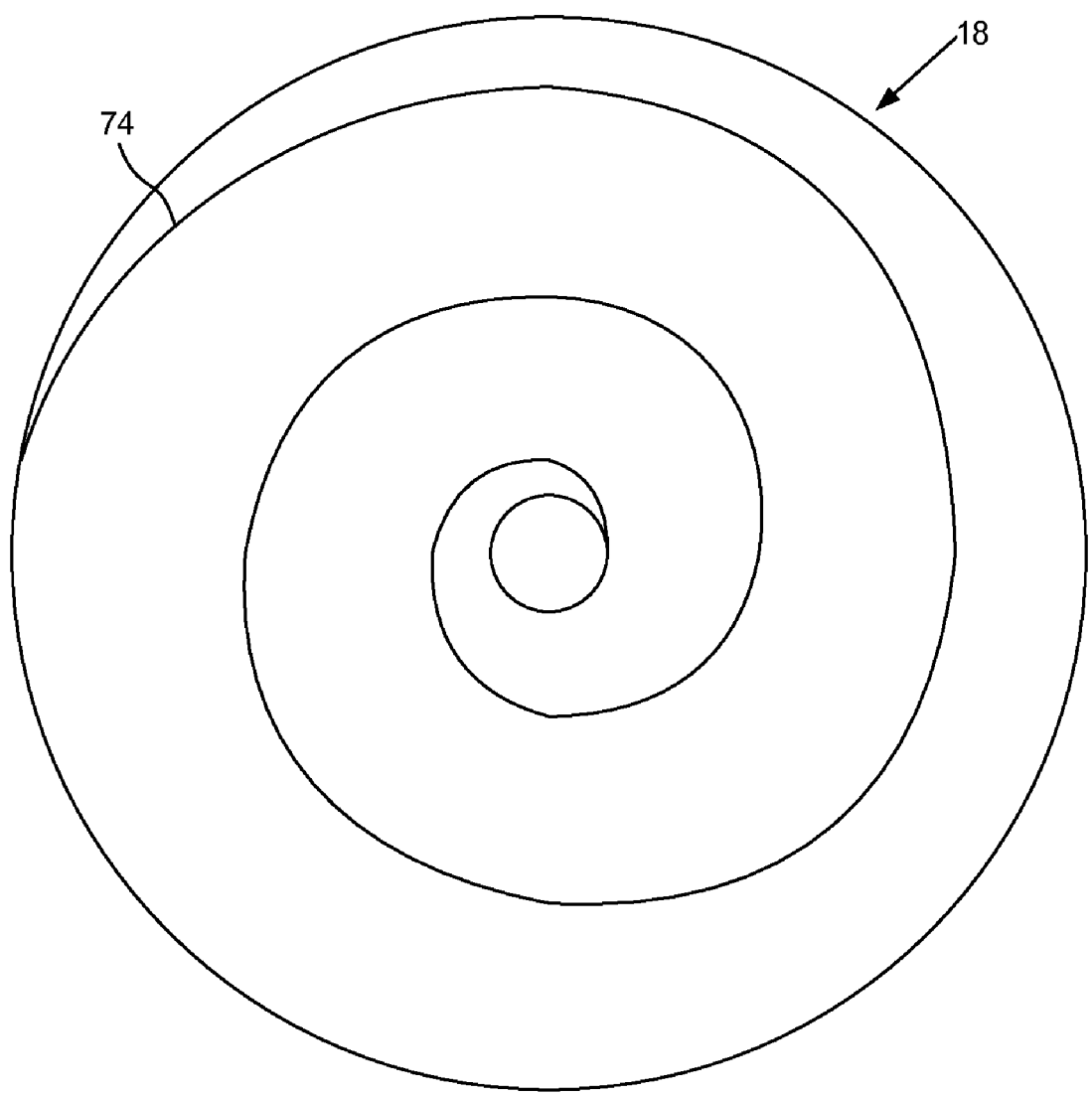
FIG. 6 shows an embodiment of the present invention wherein a spiral track is written over multiple disk revolutions.

FIG. 6 shows an embodiment of the present invention wherein the servo pattern comprises a spiral track 74 written over multiple revolutions of the disk 18, the spiral track comprising a high frequency signal interrupted by a sync mark. FIG. 7B illustrates an "eye" pattern in the read signal that is generated when the head 16 passes over the spiral track 74. The read signal representing the spiral track comprises high frequency transitions 76 interrupted by sync marks 78, wherein the high frequency transitions 76 between sync marks 78 represent a servo burst. When the head 16 moves in the radial direction, the eye pattern will shift (left or right) while the sync marks 78 remain fixed. The shift in the eye pattern (detected from the high frequency signal 76) relative to the sync marks 78 provides the off-track information (PES) for servoing the head 16.

Figure 1:
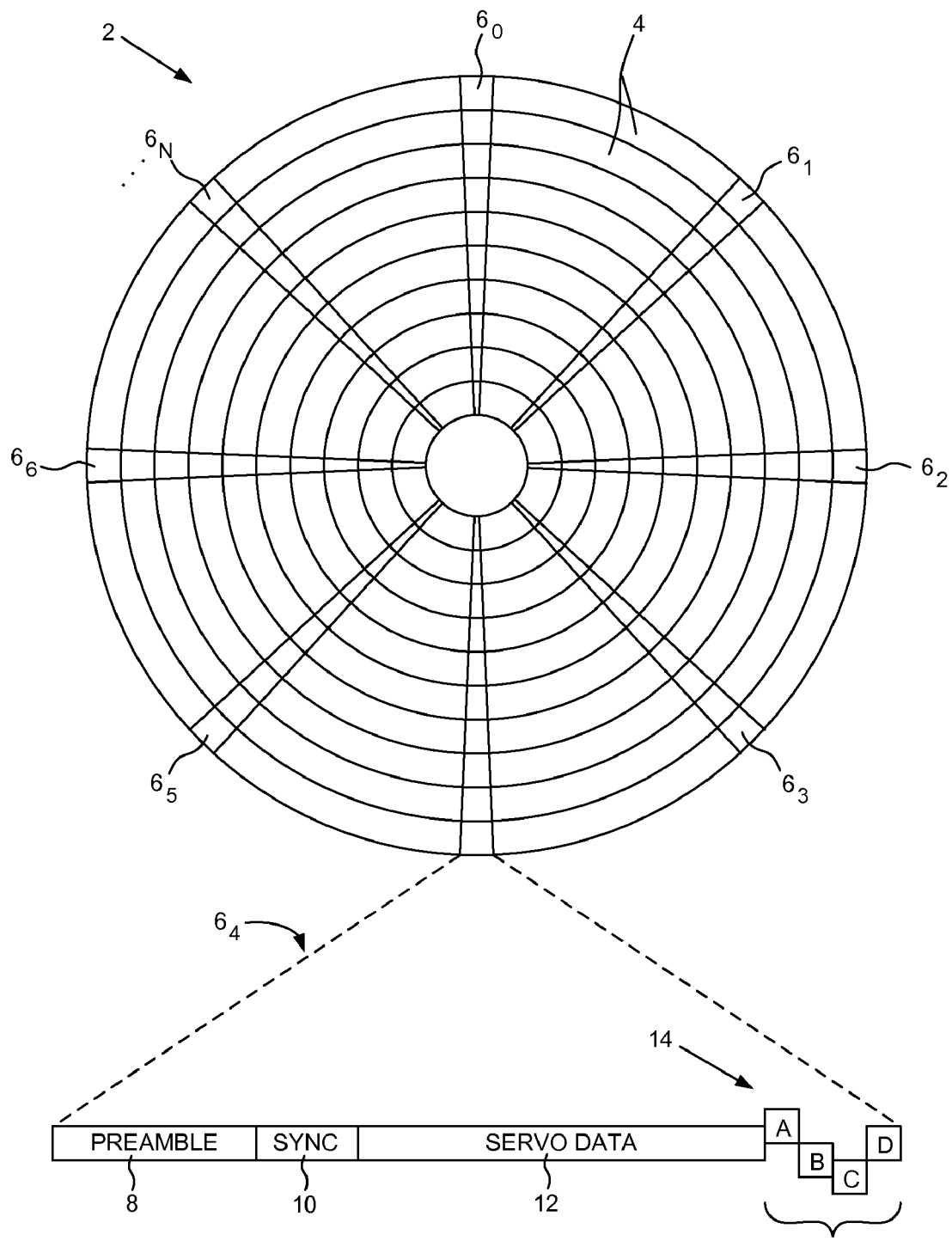
FIG. 1 shows a prior art disk format including a plurality of servo sectors that define a plurality of data tracks.

FIG. 7A shows an embodiment of the present invention wherein a saw-tooth waveform 80 is generated by clocking a modulo-N counter with a servo write clock, wherein the frequency of the servo write clock is adjusted until the sync marks 78 in the spiral track crossing are detected at a target modulo-N count value. The servo write clock may be generated using any suitable circuitry, such as a phase locked loop (PLL). As each sync mark 78 in the spiral track crossing is detected, the value of the modulo-N counter represents the phase error for adjusting the PLL. In one embodiment, the PLL is updated when any one of the sync marks 78 within the eye pattern is detected. In this manner the multiple sync marks 78 in each eye pattern (each spiral track crossing) provides redundancy so that the PLL is still updated if one or more of the sync marks 78 are missed due to noise in the read signal. Once the sync marks 78 are detected at the target modulo-N counter values, the servo write clock is coarsely locked to the desired frequency for writing concentric servo sectors to the disk 18 (as shown in FIG. 1).

In one embodiment, the servo write clock is further synchronized by generating a timing recovery measurement from the high frequency signal 76 between the sync marks 78 in the spiral track crossing. Synchronizing the servo write clock to the high frequency signal 76 helps maintain proper radial alignment (phase coherency) of Gray coded track addresses in the concentric servo sectors. The timing recovery measurement may be generated in any suitable manner. In one embodiment, the servo write clock is used to sample the high frequency signal 76 and the signal sample values are processed to generate the timing recovery measurement. The timing recovery measurement adjusts the phase of the servo write clock (PLL) so that the high frequency signal 76 is sampled synchronously. In this manner, the sync marks 78 provide a coarse timing recovery measurement and the high frequency signal 76 provides a fine timing recovery measurement for maintaining synchronization of the servo write clock.

In one embodiment, multiple spiral tracks are written to the disk and used to servo the head while writing the concentric servo sectors to the disk. The spiral tracks may be written using any suitable spacing, and with any suitable ratio relative to the concentric servo sectors. In one embodiment, the spiral tracks are written with equal spacing and at a 2 to 1 ratio relative to the concentric servo sectors.

Figure 8:
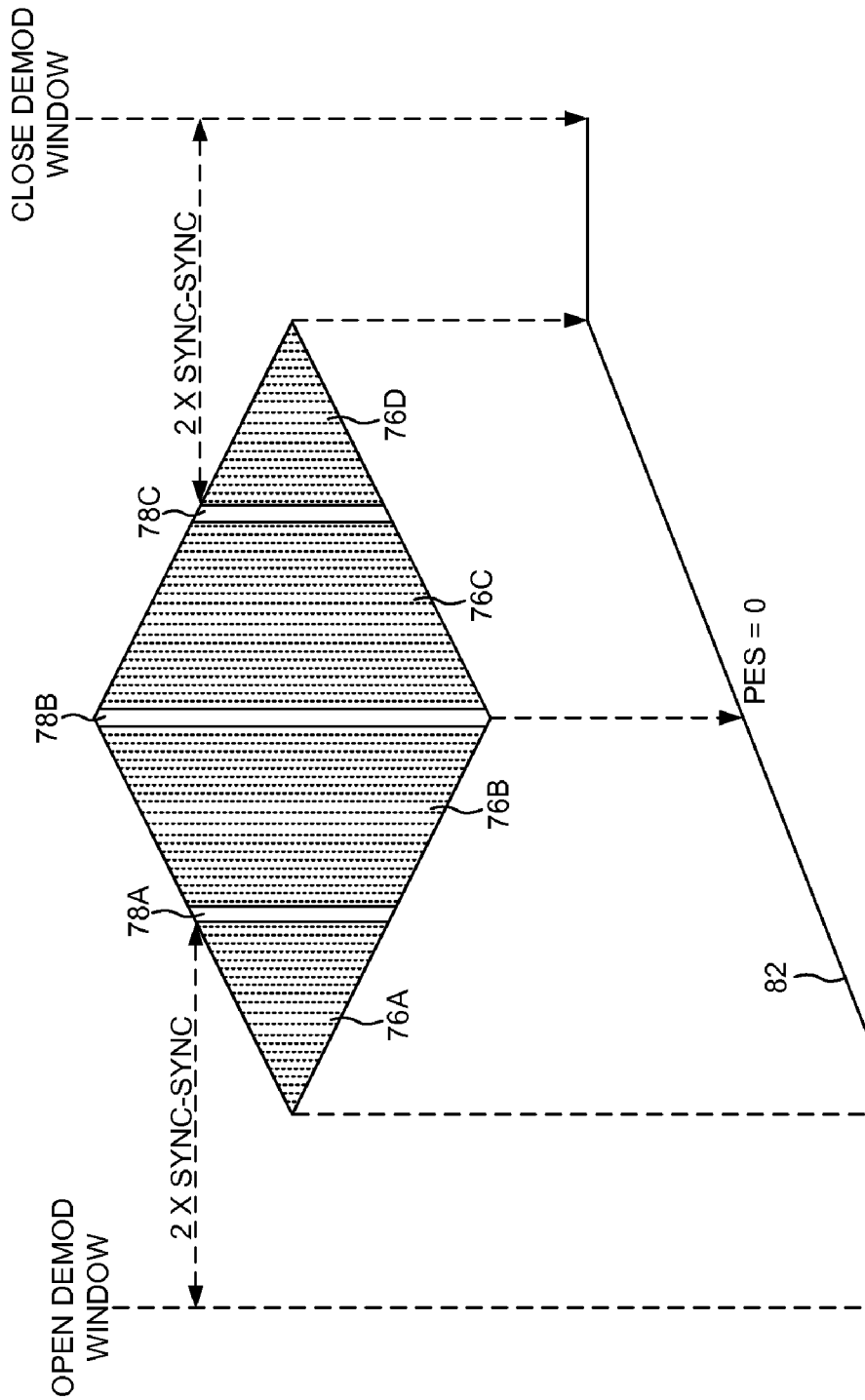
FIG. 8 illustrates an embodiment of the present invention wherein the high frequency signal in the spiral tracks is demodulated by integrating the read signal over a demodulation window and generating the PES relative to a target sync mark and a reference point on the resulting ramp signal.

FIG. 8 shows an embodiment of the present invention wherein the high frequency signal 76 in a spiral track 74 is demodulated by integrating the read signal to generate a ramp signal 82. The PES is generated relative to a target sync mark 78 in the spiral track crossing and a reference point of the ramp signal 82. In the embodiment of FIG. 8, there are three sync marks 78A-78C in each spiral track crossing (each eye pattern) and the PES is generated as the deviation of the middle sync mark 78B from the center of the ramp signal 82. This deviation can be computed as the difference in the amplitude of the ramp signal 82 when the middle sync mark 78B is detected, or the difference in time between when the middle sync mark 78B is detected and the middle of the ramp signal 82. Also in this embodiment, the demodulation window is opened a number of sync mark intervals preceding the expected spiral track crossing (one sync mark interval in this example) and closed a number of sync mark intervals after the expected spiral track crossing (one sync mark interval in this example). In one embodiment, the ramp signal 82 is generated by integrating the high frequency signal 76 between the sync marks 78; that is, integration windows within the demodulation window are generated corresponding to each servo burst (as determined from servo write clock).

Figure 9:
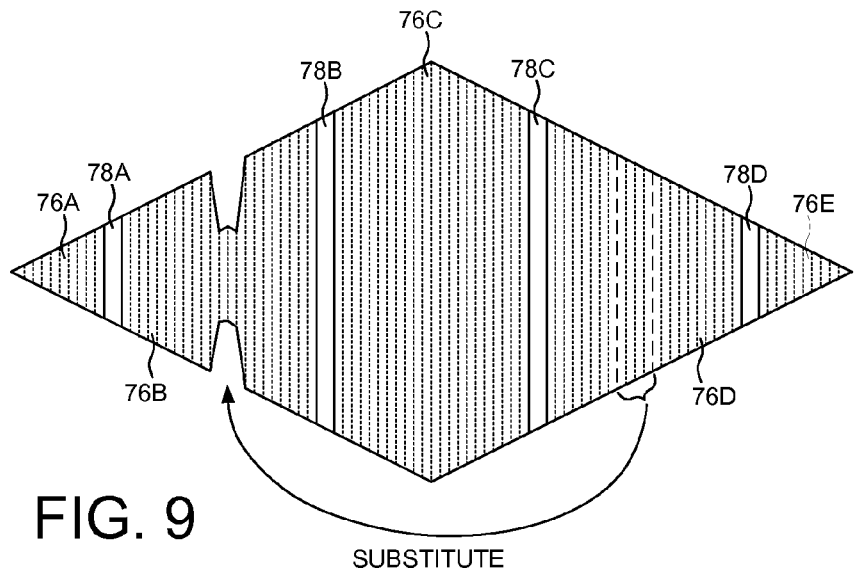
FIG. 9 illustrates a defect in a sub-burst of the eye pattern of a spiral track crossing according to an embodiment of the present invention.

FIG. 9 shows an embodiment of the present invention wherein a spiral track crossing comprises a defective sub-burst in servo burst 76B. The defective sub-burst may be detected in any suitable manner, such as by comparing a current spiral track crossing to a target spiral track crossing (e.g., a nominal or calibrated spiral track crossing based on previous spiral track crossings). When a defective sub-burst is detected, it may be compensated in any suitable manner, such as substituting a corresponding sub-burst from the target spiral track crossing. In one embodiment, a defective sub-burst in a spiral track crossing may be substituted with the corresponding symmetric sub-burst of the same spiral track crossing as illustrated in FIG. 9.

Figure 2B:
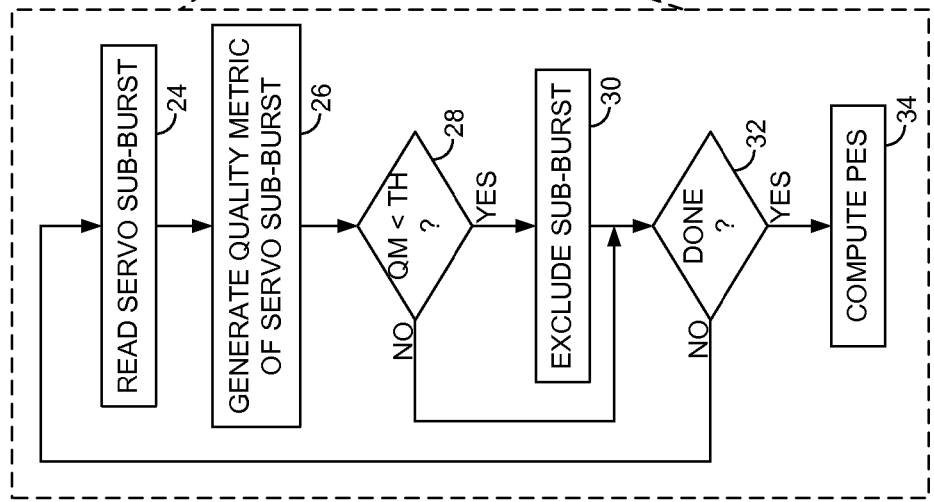
FIG. 2B is a flow diagram executed by the control circuitry according to an embodiment of the present invention wherein a servo sub-burst is excluded from a PES computation if it's quality falls below a threshold.
Figure 10:
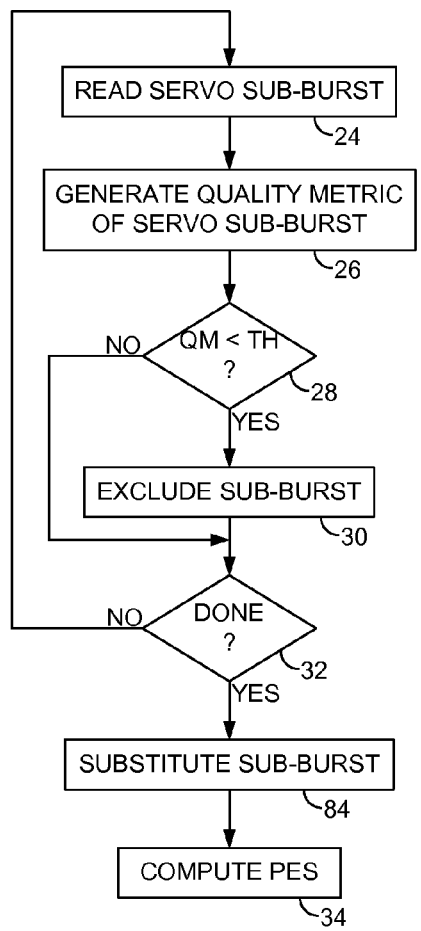
FIG. 10 is a flow diagram according to an embodiment of the present invention wherein when a defective sub-burst is detected, it is substituted with a good sub-burst before computing the PES.

FIG. 10 is a flow diagram that extends on the flow diagram of FIG. 2B according to an embodiment of the present invention, wherein when a defective sub-burst is detected and excluded, a corresponding sub-burst is substituted (step 84) prior to computing the PES. The substitute sub-burst may be generated in any suitable manner, such as from a nominal or calibrated servo burst, or from the same or different servo burst of the current servo sector.

Figure 11:
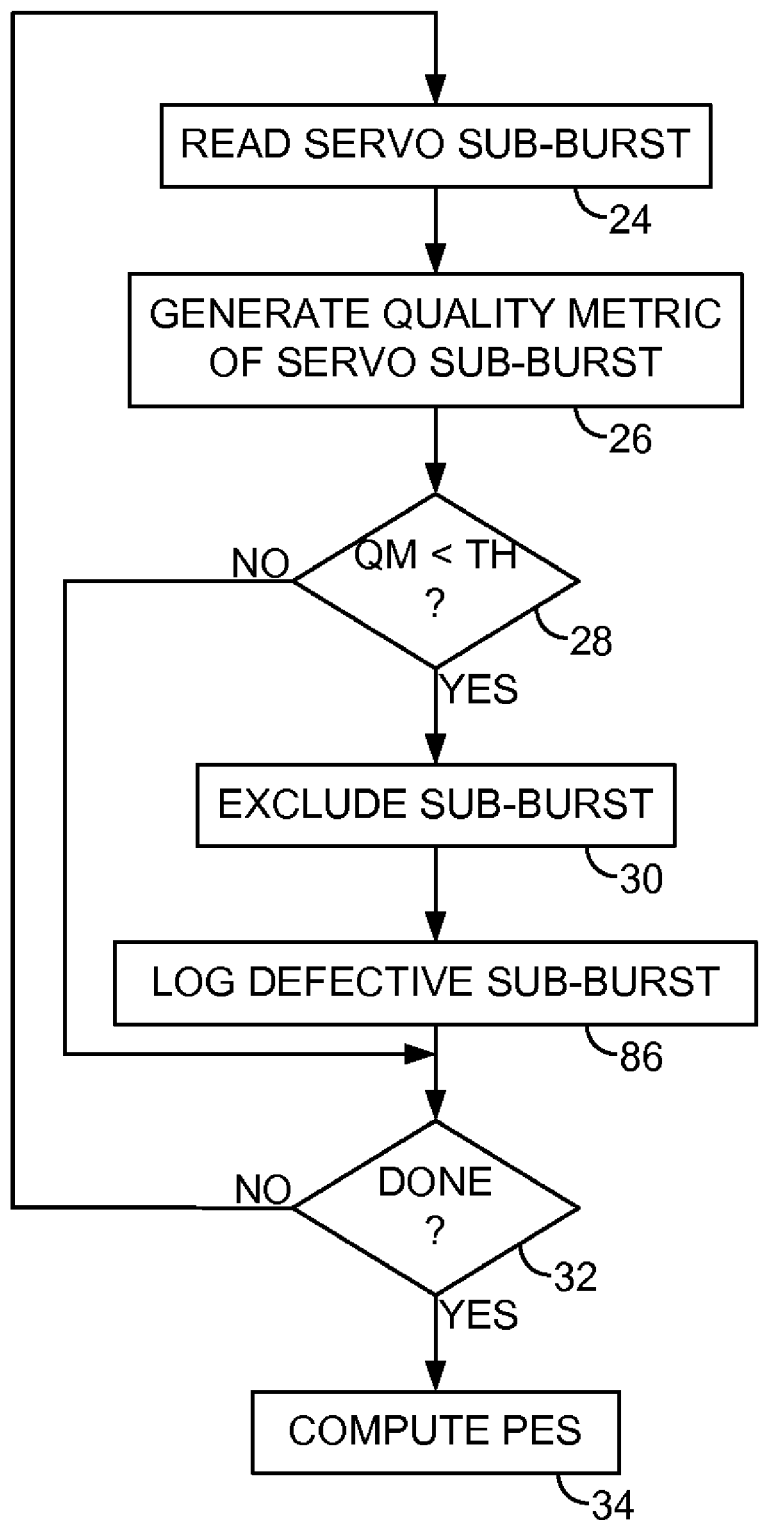
FIG. 11 is a flow diagram according to an embodiment of the present invention wherein when the quality metric of a sub-burst exceeds a threshold, an entry is saved in a defect log identifying a defect in the servo burst.

FIG. 11 is a flow diagram that extends on the flow diagram of FIG. 2B according to an embodiment of the present invention, wherein when a defective sub-burst is detected and excluded, an entry is saved in a defect log (step 86) identifying a defect in the servo burst. The defect log may be used in any suitable manner, such as failure prediction, failure analysis, defect mapping, selecting a radial density for a disk surface, etc.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo sectors wherein each servo sector comprises at least one servo burst;
   a head actuated over the disk; and
   control circuitry operable to:
   sample a read signal emanating from the head while reading a servo burst in a servo sector to generate a plurality of sample values;
   generate a quality metric in response to a plurality of sample values of a servo sub-burst representing part of the servo burst;
   when the quality metric does not exceed a threshold, exclude the servo sub-burst sample values when generating a position error signal (PES) representing a position of the head over the disk;
   when the quality metric exceeds the threshold, include the servo sub-burst sample values when generating the PES; and
   position the head over the disk in response to the PES.

2. The disk drive as recited in claim 1, wherein the control circuitry is further operable to:
   generate a plurality of quality metrics each corresponding to one of a plurality of servo sub-bursts; and
   when one of the quality metric exceeds the threshold, exclude the corresponding servo sub-burst from the PES.

3. The disk drive as recited in claim 2, wherein the servo burst comprises an amplitude based servo burst.

4. The disk drive as recited in claim 2, wherein:
   the disk comprises at least one spiral track comprising a high frequency signal interrupted by a sync mark at a sync mark interval; and
   the sync marks define a plurality of servo bursts each comprising a plurality of servo sub-bursts.

5. The disk drive as recited in claim 2, wherein when the quality metric of a first servo sub-burst in a first servo burst exceeds the threshold, the control circuitry is further operable to substitute the first servo sub-burst with a second servo sub-burst to generate the PES.

6. The disk drive as recited in claim 1, wherein:
   the read signal comprises a periodic signal; and
   the servo sub-burst comprises at least one cycle of the periodic signal.

7. The disk drive as recited in claim 1, wherein the quality metric comprises an amplitude of the read signal.

8. The disk drive as recited in claim 1, wherein the servo burst comprises a phased based servo burst.

9. The disk drive as recited in claim 1, wherein the control circuitry is further operable to generate the threshold as a running average of quality metrics generated for servo bursts of previous servo sectors.

10. The disk drive as recited in claim 1, wherein the control circuitry is further operable to generate the threshold in response to a PES generated for a previous servo sector.

11. The disk drive as recited in claim 1, wherein the control circuitry is further operable to:
    generate the quality metric relative to an amplitude of each servo sub-burst;
    compare the amplitudes of the servo sub-bursts; and
    when the amplitude of a first one of the servo sub-bursts differs from the amplitude of a second and third servo sub-burst:
    combine the amplitudes of the second and third servo sub-bursts to generate a combined amplitude signal;
    scale the combined amplitude signal to generate a scaled servo burst signal; and
    generate the PES in response to the scaled servo burst signal.

12. The disk drive as recited in claim 1, wherein when the quality metric exceeds the threshold the control circuitry is further operable to save an entry in a defect log identifying a defect in the servo burst.

13. A method of operating a disk drive comprising a disk including a plurality of servo sectors wherein each servo sector comprises at least one servo burst, and a head actuated over the disk, the method comprising:
    sampling a read signal emanating from the head while reading a servo burst in a servo sector to generate a plurality of sample values;
    generating a quality metric in response to a plurality of sample values of a servo sub-burst representing part of the servo burst;
    when the quality metric does not exceed a threshold, excluding the servo sub-burst sample values when generating a position error signal (PES) representing a position of the head over the disk;
    when the quality metric exceeds the threshold, including the servo sub-burst sample values when generating the PES; and
    positioning the head over the disk in response to the PES.

14. The method as recited in claim 13, further comprising:
    generating a plurality of quality metrics each corresponding to one of a plurality of servo sub-bursts; and
    when one of the quality metric exceeds the threshold, excluding the corresponding servo sub-burst from the PES.

15. The method as recited in claim 14, wherein the servo burst comprises an amplitude based servo burst.

16. The method as recited in claim 14, wherein:
    the disk comprises at least one spiral track comprising a high frequency signal interrupted by a sync mark at a sync mark interval; and
    the sync marks define a plurality of servo bursts each comprising a plurality of servo sub-bursts.

17. The method as recited in claim 14, wherein when the quality metric of a first servo sub-burst in a first servo burst exceeds the threshold, the control circuitry is further operable to substitute the first servo sub-burst with a second servo sub-burst to generate the PES.

18. The method as recited in claim 13, wherein:
    the read signal comprises a periodic signal; and
    the servo sub-burst comprises at least one cycle of the periodic signal.

19. The method as recited in claim 13, wherein the quality metric comprises an amplitude of the read signal.

20. The method as recited in claim 13, wherein the servo burst comprises a phased based servo burst.

21. The method as recited in claim 13, further comprising generating the threshold as a running average of quality metrics generated for servo bursts of previous servo sectors.

22. The method as recited in claim 13, further comprising generating the threshold in response to a PES generated for a previous servo sector.

23. The method as recited in claim 13, further comprising:
    generating the quality metric relative to an amplitude of each servo sub-burst;
    comparing the amplitudes of the servo sub-bursts; and
    when the amplitude of a first one of the servo sub-bursts differs from the amplitude of a second and third servo sub-burst:

combining the amplitudes of the second and third servo sub-bursts to generate a combined amplitude signal;

scaling the combined amplitude signal to generate a scaled servo burst signal; and generating the PES in response to the scaled servo burst signal.

24. The method as recited in claim 13, wherein when the quality metric exceeds the threshold further comprising saving an entry in a defect log identifying a defect in the servo burst.

* * * * *